WILLIAM H. DOBSON.
Improvement in Scroll-Sawing Machines.

No. 114,778. Patented May 16, 1871.

Inventor:
W. H. Dobson By
W. S. Loughborough & Co
Attys

Witnesses:
E. Baldwin
James Ethridge

United States Patent Office.

WILLIAM H. DOBSON, OF ROCHESTER, NEW YORK.

Letters Patent No. 114,778, dated May 16, 1871.

IMPROVEMENT IN SCROLL-SAWING MACHINES.

The Schedule referred to in these Letters Patent and making part of the same.

I, WILLIAM H. DOBSON, of Rochester, in the county of Monroe and State of New York, have invented certain Improvements in "Scroll-Saws," of which the following is a specification.

My invention consists in an improved form of the elastic straining-spring described in my patent of January 31, 1871, and also in a novel construction and arrangement of the guide-bars and portions of the supporting frame of the machine.

In the drawing—

The straining-spring $b\ c$ of the saw is attached to and supported by the cross-head C, which is suspended from the ceiling of the shop over the table H, in the usual manner.

A flexible strap, $m$, passes from the segment $a$ upon the spring to the upper extremity of the saw D, and since one portion of said strainer is twisted right-handed and the other left-handed, as fully described in my patent above mentioned, its tension is always exerted to strain the saw.

The fibrous elastic cords $c$ of this strainer are attached to flanges $e$ upon spindles $d$, and at the opposite end to other flanges $i$ upon the segment $a$.

A core, $b$, of rubber or other soft elastic substance, is provided between the flanges $e$ and $i$, upon which the cords $c$ are cushioned, and thus prevented from being chafed or abraded by the action of the saw, while at the same time the elasticity of the rubber, as well as the tension of the cords, is utilized in straining the saw.

Figure 3:
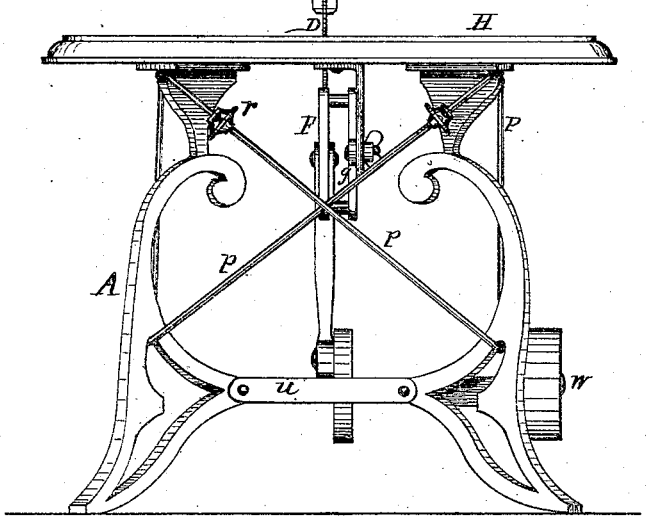
Figure 3:
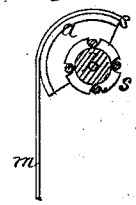

One or more spreaders, $s$, are also placed upon the sections of the straining-spring, which may consist of disks of leather or other suitable material, having notches in their periphery, as shown in fig. 3. They operate to retain the cords at equal distances around the core or cushion $b$, whereby the strain upon the parts of the spring is more evenly distributed and the cords are prevented from chafing each other.

The tension of the strain is regulated by nuts $o$ upon the spindles $d$, which control such tension longitudinally, and by the collars $t$, which govern the amount of twist or circumferential adjustment, as described in my former patent.

The guides F, for the reciprocating movement of the saw, as heretofore constructed in this class of machines, have been pivoted at their upper extremities to the saw-table or frame, and were swung in either direction by suitable means, for the purpose of regulating the "rake" or forward inclination of the saw. When, however, the guides are at their extreme adjustment, the saw is drawn away from the upper rest $l$, and is thus liable to be broken by the pressure of the work against it.

Figure 2:
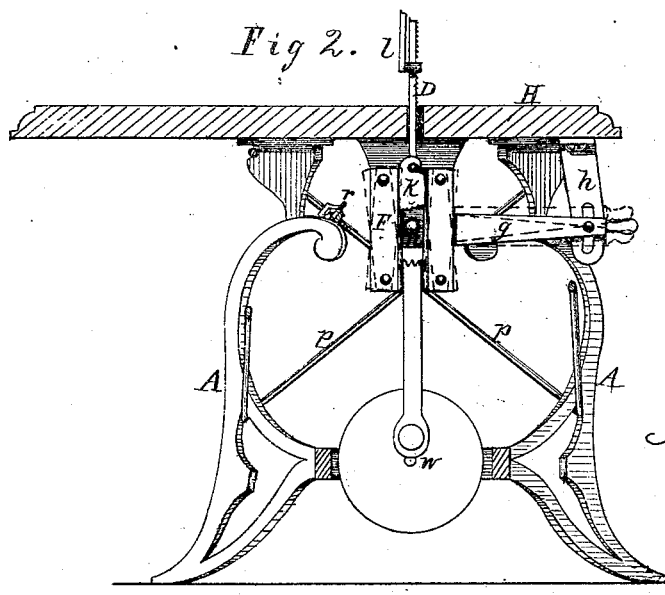
Figure 2 is a sectional side elevation.

I obviate this difficulty partially by pivoting the guides F, fig. 2, to the frame of the machine at the center of the stroke of the cross-head $k$, whereby, when adjusted about this central point $n$, the rake of the saw is divided upon both sides of the center line drawn through the point $n$, and the saw kept more nearly in contact with the rest.

The arm $g$, made fast to the guides, is adjustable upon a slotted segment, $h$, by means of a suitable set-screw, and the rake of the saw can thus be readily controlled by the operator at any time.

On account of the continuous jar caused by the operation of the saw, it is essential that the supporting frame be very rigid, and I therefore construct the frame A with three or more legs or supports, secured at the upper end to the table H, and suitably bolted together at or near the base by means of a cross-tie, $u$, which, in this case, forms a bearing for the driving-shaft $w$.

Figure 1:
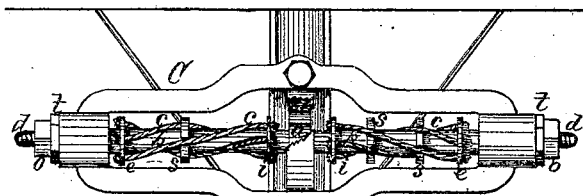
Figure 1 is a front elevation.

These legs are provided at top and bottom with recesses or openings to receive diagonal tie-rods $p$, extending from the lower part of one leg around the upper portion of the next, and thence downward to the succeeding one entirely around the machine, as indicated in figs. 1 and 2.

Swivel or other suitable nuts $r$ are applied to the rods, by which they are drawn up after being attached to the frame in the manner described, and thereby all parts of the latter are very securely braced and stiffened. These rods are preferably made of small round iron, and are therefore cheap in construction and easily applied.

What I claim as my invention is—

1. The arrangement in a sawing-machine of the guide F, provided with the arm $g$, cross-head $k$, and slotted segment $h$, as herein shown and described, and for the purposes set forth.

2. As an improvement in saw-strainers, the elastic or yielding cushion $b$, provided with spreaders $s$, in combination with the straining-cords $c$, for the purposes set forth.

W. H. DOBSON.

Witnesses:
 WM. S. LOUGHBOROUGH,
 F. H. CLEMENT.